(12) United States Patent
Fujie et al.

(10) Patent No.: US 12,529,449 B2
(45) Date of Patent: Jan. 20, 2026

(54) PRESSURE TANK UNIT

(71) Applicants: TOYOTA JIDOSHA KABUSHIKI KAISHA, Toyota (JP); KOJIMA INDUSTRIES CORPORATION, Toyota (JP)

(72) Inventors: Yuki Fujie, Toyota (JP); Naoki Ueda, Toyota (JP); Ryosuke Niwa, Toyota (JP); Yusuke Fujii, Toyota (JP); Koji Ando, Toyota (JP)

(73) Assignees: TOYOTA JIDOSHA KABUSHIKI KAISHA, Toyota (JP); KOJIMA INDUSTRIES CORPORATION, Toyota (JP)

( * ) Notice: Subject to any disclaimer, the term of this patent is extended or adjusted under 35 U.S.C. 154(b) by 0 days.

(21) Appl. No.: 18/762,248

(22) Filed: Jul. 2, 2024

(65) Prior Publication Data
US 2025/0020277 A1 Jan. 16, 2025

(30) Foreign Application Priority Data
Jul. 11, 2023 (JP) ................................. 2023-113703

(51) Int. Cl.
*F17C 1/02* (2006.01)

(52) U.S. Cl.
CPC ........ *F17C 1/02* (2013.01); *F17C 2201/0109* (2013.01); *F17C 2203/012* (2013.01); *F17C 2203/0604* (2013.01); *F17C 2203/0619* (2013.01); *F17C 2203/0673* (2013.01)

(58) Field of Classification Search
CPC ........ F17C 1/02; F17C 1/04; F17C 2203/011; F17C 2205/0308; F17C 2260/011; F17C 13/123; F17C 13/126
See application file for complete search history.

(56) References Cited

U.S. PATENT DOCUMENTS

| | | |
|---|---|---|
| 2004/0026437 A1* | 2/2004 | Hembert ............... F17C 13/123 220/630 |
| 2015/0240997 A1* | 8/2015 | Azizi ........................ F17C 1/14 156/60 |
| 2018/0156387 A1* | 6/2018 | Maekawa ............... F17C 13/04 |

(Continued)

FOREIGN PATENT DOCUMENTS

| | | |
|---|---|---|
| CN | 1109216 C | 5/2003 |
| EP | 4438937 A1 | 10/2024 |

(Continued)

*Primary Examiner* — Don M Anderson
(74) *Attorney, Agent, or Firm* — Hunton Andrews Kurth LLP

(57) ABSTRACT

A pressure tank unit may include: a tank including a container space which contains compressed gas; and a plurality of protectors bonded to a surface of the tank, wherein the tank may include: a body part having a cylindrical shape; and a dome part provided at an end of the body part and having a hemispherical shape, the plurality of protectors may be arranged along a boundary between the body part and the dome part in a circumferential direction of the tank, each of the plurality of protectors may have a first portion covering the dome part and a second portion covering the body part, and an inner surface of the second portion facing the body part may include at least one bonding area bonded to the body part via a bonding material.

5 Claims, 4 Drawing Sheets

(56) References Cited

U.S. PATENT DOCUMENTS

| | | | |
|---|---|---|---|
| 2019/0203883 A1* | 7/2019 | Kojima | F17C 1/02 |
| 2019/0226641 A1* | 7/2019 | Ogiwara | F17C 13/12 |
| 2020/0132252 A1* | 4/2020 | Silva Vieira | F17C 1/16 |
| 2023/0091329 A1* | 3/2023 | Fujii | F17C 1/00 220/203.23 |

FOREIGN PATENT DOCUMENTS

| | | | |
|---|---|---|---|
| JP | 2017101763 A | 6/2017 | |
| JP | 2023044959 A | 4/2023 | |
| WO | 2023096238 A1 | 6/2023 | |

* cited by examiner

PRESSURE TANK UNIT

REFERENCE TO RELATED APPLICATION

This application claims priority to Japanese Patent Application No. 2023-113703 filed on Jul. 11, 2023. The entire content of the priority application is incorporated herein by reference.

BACKGROUND

The art disclosed herein relates to a pressure tank unit configured to store compressed gas.

Japanese Patent Application Publication No. 2023-044959 describes a pressure tank unit mounted in a vehicle. The pressure tank unit includes a tank and a protector bonded to a surface of the tank. The tank includes a body part having a cylindrical shape and a dome part having a hemispherical shape and arranged at an end of the tank. The protector is arranged to cover the dome part of the tank and configured to protect the tank from external impact.

SUMMARY

In the above-mentioned pressure tank unit, the protector is bonded to the dome part via a bonding material. The tank is structured such that a surface roughness of the dome part is higher than a surface roughness of the body part. It means that a gap may be unintentionally formed at a bonded area between the dome part and the protector, and the protector may be detached from the tank when external impact is applied on the protector. The present disclosure provides an art configured to prevent or suppress a protector from being detached from a tank.

The techniques disclosed herein are embodied by a pressure tank unit. In a first aspect, a pressure tank unit may comprise: a tank comprising a container space which contains compressed gas; and a plurality of protectors bonded to a surface of the tank, wherein the tank may comprise: a body part having a cylindrical shape; and a dome part provided at an end of the body part and having a hemispherical shape, the plurality of protectors may be arranged along a boundary between the body part and the dome part in a circumferential direction of the tank, each of the plurality of protectors may have a first portion covering the dome part and a second portion covering the body part, and an inner surface of the second portion facing the body part may comprise at least one bonding area bonded to the body part via a bonding material.

In the above-described pressure tank unit, the plurality of protectors has a structure of being aligned along the circumferential direction. According to such a configuration, each protector covers not only the dome part but also the body part. Due to this, each protector can be bonded to the body part in addition to or instead of the dome part. As mentioned above, the surface roughness of the body part is smaller than the surface roughness of the dome part. Accordingly, each protector can be firmly bonded to the tank, by which each protector can be prevented or suppressed from being detached from the tank.

In a second aspect, in addition to the first aspect, the at least one bonding area may comprise a first bonding area and a second bonding area, wherein the first bonding area and the second bonding area are independent of each other. When each protector has a structure of being bonded to the tank at two or more independent bonding areas, each protector can be firmly bonded to the surface of the tank even if there are curves and/or bumps and dips on the tank surface.

In a third aspect, in addition to the above-mentioned second aspect, the first bonding area and the second bonding area may be aligned along the circumferential direction. The surface of the body part of the tank is curved mainly along the circumferential direction. Accordingly, when two or more bonding areas are aligned along the circumferential direction, each protector can be firmly bonded to the body part's surface which is curved along the circumferential direction.

In a fourth aspect, in addition to the above-mentioned second or third aspect, a groove may be defined between the first bonding area and the second bonding area in the inner surface of the second portion. According to a such configuration, a flexibility of each protector with respect to the circumferential direction can be improved and thus each protector can be firmly bonded to the surface of the body part which is curved along the circumferential direction.

In a fifth aspect, in any of the above-mentioned first to fourth aspects, an inner surface of the first portion which faces the dome part may comprise a protrusion protruding toward the dome part. In this case, the inner surface of the first portion may be in contact with the dome part at the protrusion and face the dome part via a clearance at a portion other than the protrusion. According to such a configuration, a dimension error at the dome part can be allowed.

DESCRIPTION

Embodiment

Figure 1:
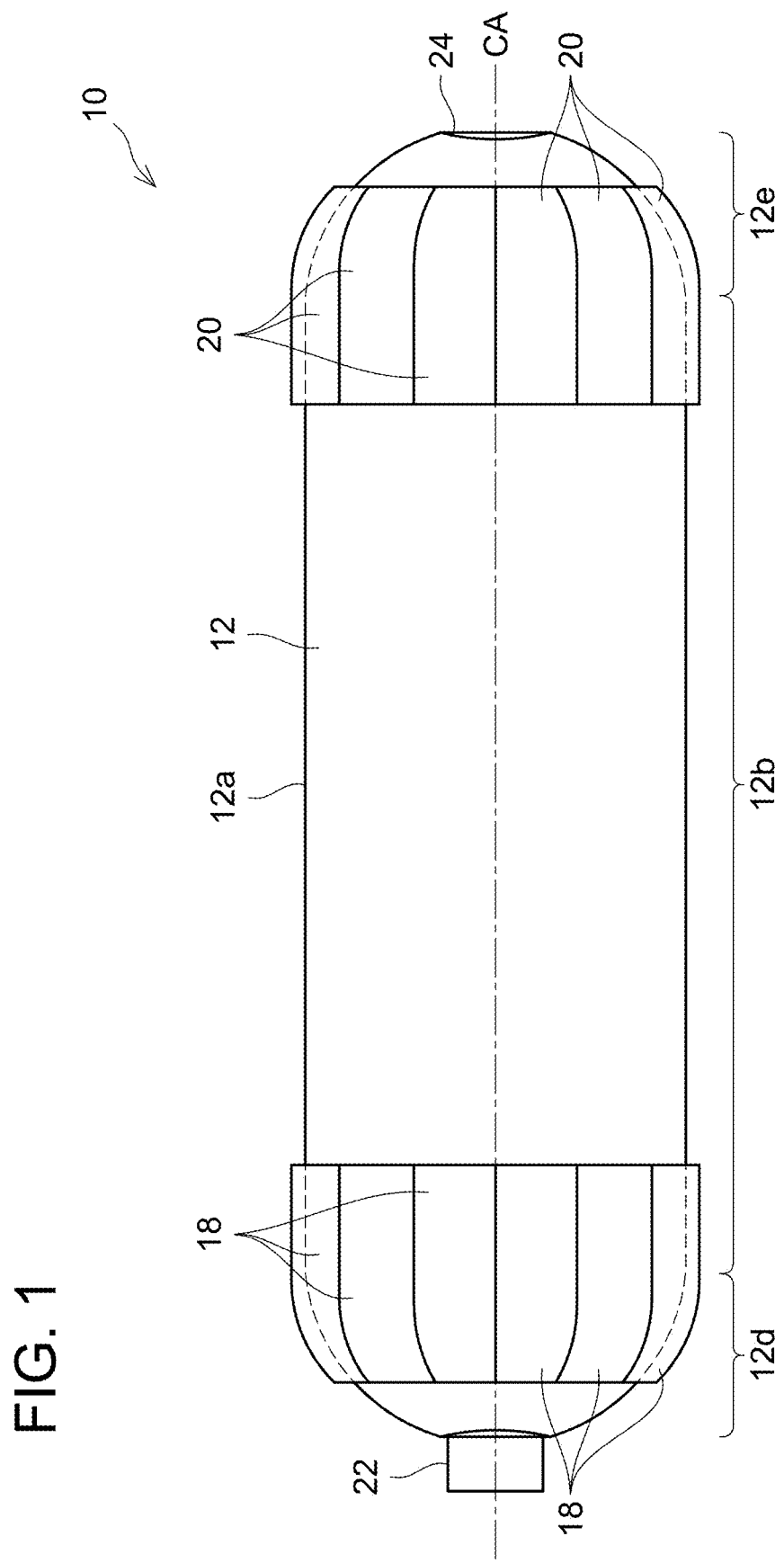
FIG. 1 illustrates a plan view showing a configuration of a pressure tank unit.
Figure 2:
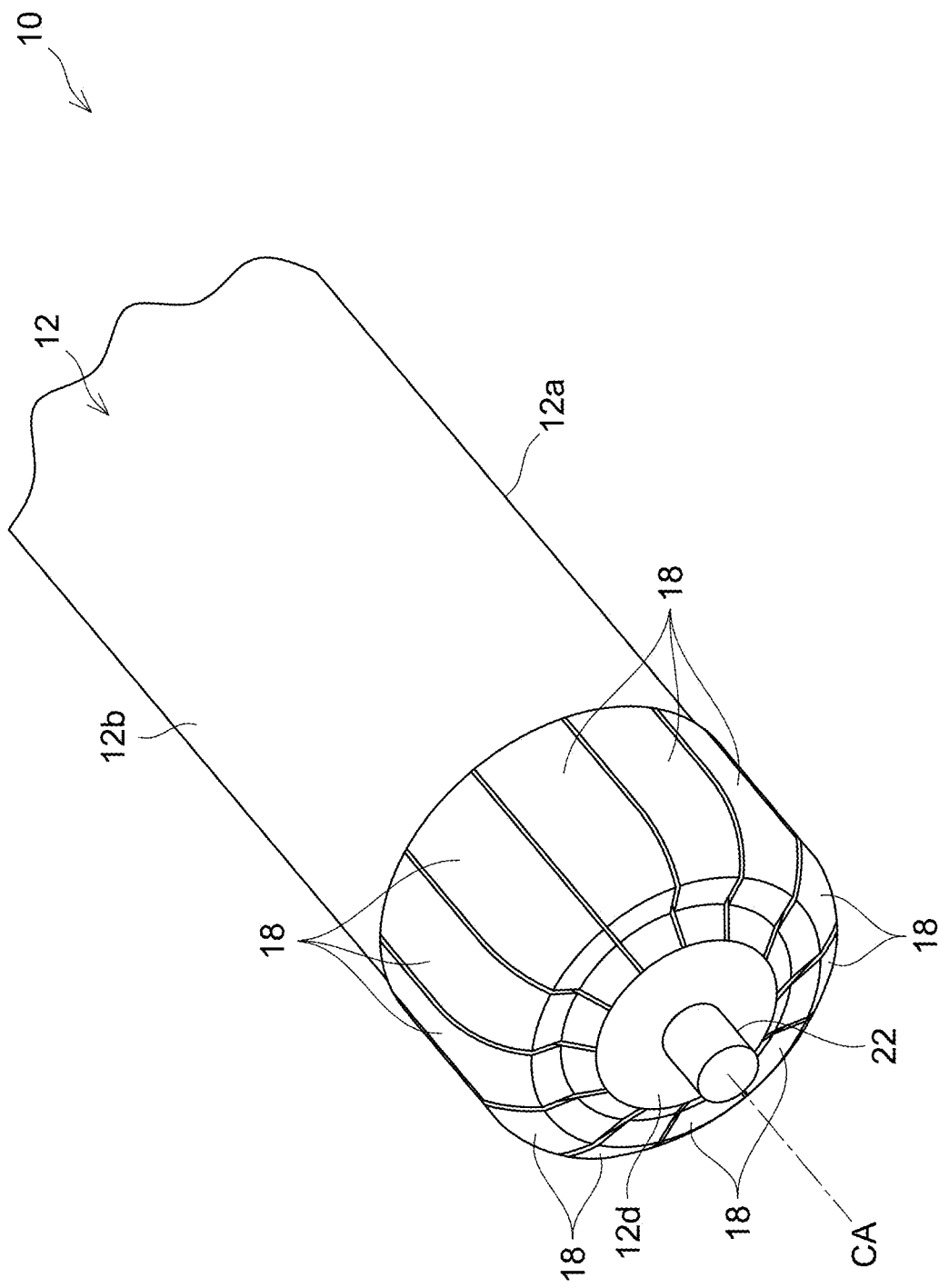
FIG. 2 illustrates a perspective view showing the configuration of the pressure tank unit.
Figure 3:
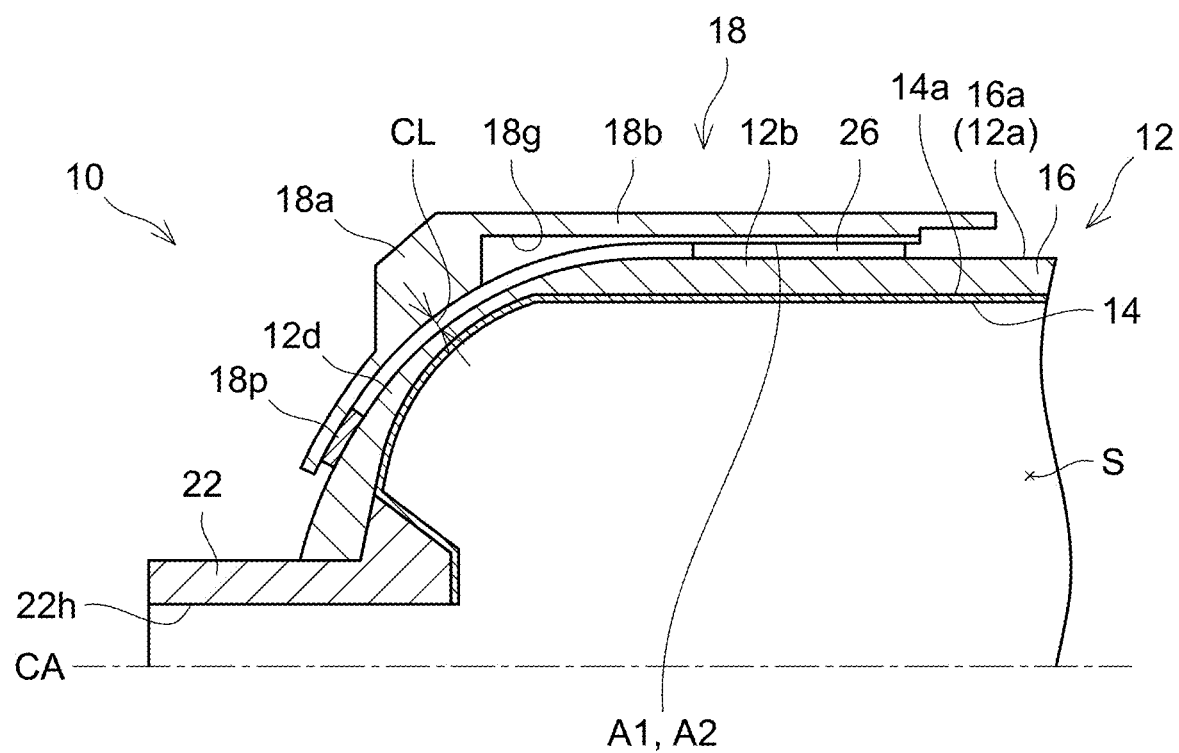
FIG. 3 illustrates a partial cross-sectional view of the pressure tank unit taken along a plane passing through a central axis of a tank.

With reference to drawings, a pressure tank unit 10 according to an embodiment will be described. As shown in FIGS. 1 and 2, the pressure tank unit 10 comprises a tank 12, a plurality of first protectors 18, and a plurality of second protectors 20. As shown in FIG. 3, the tank 12 has a container space S. Compressed gas is contained in the container space S. The compressed gas is for example a hydrogen gas compressed to a high pressure. The pressure tank unit 10 is mounted on a vehicle such as a fuel cell electric vehicle, for example.

The tank 12 includes a body part 12b, a first dome part 12d, and a second dome part 12e. The body part 12b has a cylindrical shape extending along a central axis CA. The first dome part 12d is arranged at one end of the body part 12b. The first dome part 12d has a hemispherical shape bulged outward from the body part 12b along the central axis CA. The second dome part 12e is arranged at another end of the body part 12b. The second dome part 12e also has a hemispherical shape bulged outward from the body part 12b along the central axis CA.

Here, in the art disclosed herein, the "body part" means a section where an outer diameter of the tank 12 is substantially constant, and the "dome part" means a section where the outer diameter of the tank 12 decreases as it separates away from the body part 12b. "Substantially constant" means a variation in the outer diameter being approximately 10% or less.

As shown in FIGS. 2 and 3, the tank 12 comprises a liner 14, a reinforcement layer 16, and two mouth rings 22, 24. The liner 14 defines the container space S for the compressed gas internally. The liner 14 is constituted of a material having a high gas barrier property, such as polyamide resin. Due to this, outward permeation of the compressed gas can be suppressed.

The two mouth rings 22, 24 are disposed at opposing ends of the tank 12. That is, one mouth ring 22 is disposed at the first dome part 12d whereas the other mouth ring 24 is disposed at the second dome part 12e. The mouth ring 22 of the first dome part 12d has a through hole 22h. The through hole 22h is connected with the container space S within the tank 12. A valve unit (not shown) configured to open/close the through hole 22h is attached to the mouth ring 22 of the first dome part 12d. The two mouth rings 22, 24 are positioned on the central axis CA of the tank 12.

The reinforcement layer 16 covers an outer surface 14a of the liner 14. The reinforcement layer 16 is constituted of fiber-reinforced plastic such as carbon fiber reinforced plastic (CFRP). The reinforcement layer 16 is shaped by filament winding. As is known, the filament winding includes winding filaments impregnated with thermosetting resin on the surface 14a of the liner 14 and thereafter curing the resin by heat treatment. The reinforcement layer 16 is shaped by helical winding at the dome parts 12d, 12e of the tank 12. On the other hand, the reinforcement layer 16 is shaped by hoop winding at the body part 12b of the tank 12. Owing to these windings, a surface roughness of the dome parts 12d, 12e is higher than a surface roughness of the body part 12b. The reinforcement layer 16 is not limited to the above configuration. The reinforcement layer 16 may further comprise a layer of glass fiber reinforced plastic (GFRP) for surface protection in addition to the CFRP layer.

The plurality of first protectors 18 and the plurality of second protectors 20 are members for protecting the tank 12 from external impact. The plurality of first protectors 18 and the plurality of second protectors 20 are bonded to an outer surface 12a of the tank 12 (i.e., surface 16a of the reinforcement layer 16). The plurality of first protectors 18 is arranged on a first dome part 12d side of the tank 12. The plurality of first protectors 18 is aligned in the circumferential direction of the tank 12 along a boundary between the body part 12b and the first dome part 12d. The plurality of first protectors 18 covers the first dome part 12d of the tank 12 and a portion of the body part 12b. The plurality of first protectors 18 surrounds entirely a periphery of the mouth ring 22 at a certain interval from the mouth ring 22.

Each first protector 18 has a structure configured to absorb impact energy. For example, each first protector 18 may have a porous structure constituted of foamed polyurethane resin. Alternatively, each first protector 18 may have a structure with a plurality of ribs defined on its outer surface or inner surface and having a plurality of spaces defined by the plurality of ribs.

Figure 4:
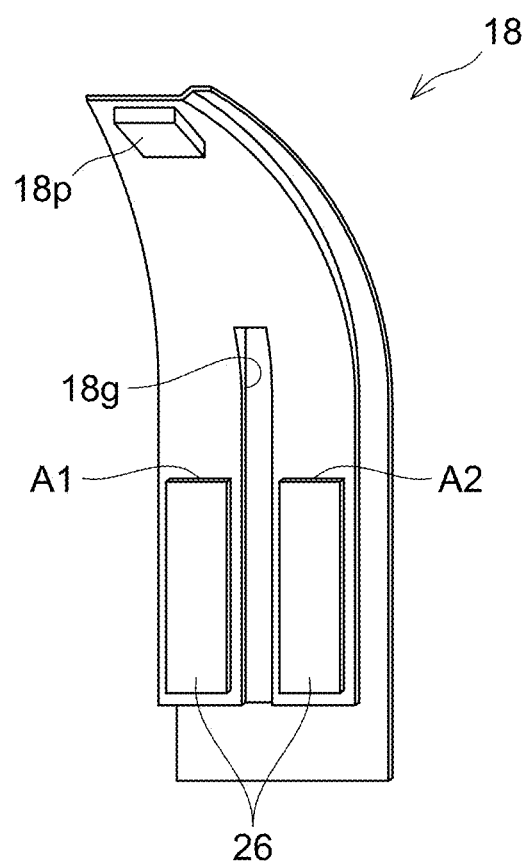
FIG. 4 illustrates a view showing a configuration of a first protector.

As shown in FIGS. 3 and 4, each first protector 18 includes a first portion 18a covering the first dome part 12d and a second portion 18b covering the body part 12b. An inner surface of the first portion 18a which faces the first dome part 12d has a protrusion 18p protruding toward the first dome part 12d. The protrusion 18p is in contact with the first dome part 12d. The inner surface of the first portion 18a which faces the first dome part 12d faces the first dome part 12d via a clearance CL at portions other than the protrusion 18p. According to such a configuration, dimension tolerance of the first dome part 12d can be allowed. In a modification, the inner surface of the first portion 18a which faces the first dome part 12d may have a bonding area bonded to the first dome part 12d via a bonding material at the protrusion 18p. In another modification, the inner surface of the first portion 18a which faces the first dome part 12d may not have the protrusion 18p.

The second portion 18b includes a first bonding area A1 and a second bonding area A2. The first bonding area A1 and the second bonding area A2 are bonded to the body part 12b of the tank 12 via a bonding material 26. Although this is merely an example, the bonding material 26 is sheet-like. Although this is merely an example, the first bonding area A1 and the second bonding area A2 are independent of each other. The first bonding area A1 and the second bonding area A2 are aligned in the circumferential direction. Each of the first bonding area A1 and the second bonding area A2 is substantially rectangular and extends long along a direction parallel to the central axis CA of the tank 12.

Each first protector 18 has a groove 18g defined between the first bonding area A1 and the second bonding area A2 of the second portion 18b. According to such a configuration, flexibility of the first protectors 18 with respect to the circumferential direction can be improved, and each first protector 18 is firmly bonded to the body part 12b's surface which is curved along the circumferential direction. A specific configuration of the groove 18g is not limited in particular. The groove 18g extends entirely between the first bonding area A1 and the second bonding area A2. The groove 18g extends from between the first bonding area A1 and the second bonding area A2 to the first portion 18a.

The plurality of second protectors 20 is arranged on a second dome part 12e side of the tank 12. The plurality of second protectors 20 may have the same configuration as that of the plurality of first protectors 18.

In the pressure tank unit 10 according to the present embodiment, the pluralities of protectors 18, 20 have the structure of being aligned along the circumferential direction. According to such a configuration, each protector 18, 20 can be shaped to cover not only its corresponding first dome part 12d, 12e but also the body part 12b. Due to this, each protector 18, 20 can be bonded to the body part 12b in addition to or instead of the corresponding first dome part 12d, 12e. As mentioned above, the surface roughness of the body part 12b is smaller than the surface roughness of the first dome parts 12d, 12e due to the structure of the tank 12. Accordingly, formation of gaps between the plurality of protectors 18, 20 and the surface 12a of the tank 12 can be prevented in the first bonding area A1 and the second bonding area A2. Each protector 18, 20 can be firmly bonded to the tank 12, by which each protector 18, 20 can be prevented or suppressed from being detached from the tank 12.

Also, each protector 18, 20 comprises the two bonding areas A1, A2, wherein the two bonding areas A1, A2 are independent of each other. That is, each protector 18, 20 is bonded to the surface 12a of the tank 12 at two or more independent bonding areas A1 and A2 respectively. According to such a configuration, each protector 18, 20 is firmly bonded to the surface 12a of the tank 12 even if there are curves and/or bumps and dips on the surface 12a of the tank 12.

The above-mentioned two bonding areas A1, A2 are aligned along the circumferential direction of the tank 12.

The surface of the body part 12b of the tank 12 is curved mainly along the circumferential direction. Accordingly, when two or more bonding areas A1 and A2 are aligned along the circumferential direction, each protector 18, 20 is firmly bonded to the body part 12b's surface which is curved along the circumferential direction.

However, the configurations of the bonding areas A1 and A2 in each protector 18, 20 are not limited to the specific configurations described in the embodiment. The two or more bonding areas A1 and A2 may not be arranged side by side along the circumferential direction of the tank 12, but may be arranged side by side along the direction parallel to the central axis CA of the tank 12. In this case, each bonding area A1, A2 may extend long along the circumferential direction of the tank 12 to enlarge an area of the bonding areas A1, A2. Further, the number of bonding areas A1 and A2 in each protector 18, 20 is not limited to two. Each protector 18, 20 simply needs to comprise at least one bonding area.

What is claimed is:

1. A pressure tank unit comprising:
   a tank comprising a container space which contains compressed gas; and
   a plurality of protectors bonded to a surface of the tank,
   wherein the tank comprises: a body part having a cylindrical shape; and a dome part provided at an end of the body part and having a hemispherical shape,
   the plurality of protectors is arranged along a boundary between the body part and the dome part in a circumferential direction of the tank,
   each of the plurality of protectors has a first portion covering the dome part and a second portion covering the body part,
   an inner surface of the second portion facing the body part comprises at least one bonding area bonded to the body part via a bonding material, and
   the at least one bonding area comprises a first bonding area and a second bonding area, wherein the first bonding area and the second bonding area are independent of each other.

2. The pressure tank unit according to claim 1, wherein the first bonding area and the second bonding area are aligned along the circumferential direction.

3. The pressure tank unit according to claim 2, wherein a groove is defined between the first bonding area and the second bonding area in the inner surface of the second portion.

4. The pressure tank unit according to claim 1, wherein an inner surface of the first portion which faces the dome part comprises a protrusion protruding toward the dome part, and the inner surface of the first portion is in contact with the dome part at the protrusion and faces the dome part via a clearance at a portion other than the protrusion.

5. A pressure tank unit comprising:
   a tank comprising a container space which contains compressed gas; and
   a plurality of protectors bonded to a surface of the tank,
   wherein the tank comprises: a body part having a cylindrical shape; and a dome part provided at an end of the body part and having a hemispherical shape,
   the plurality of protectors is arranged along a boundary between the body part and the dome part in a circumferential direction of the tank,
   each of the plurality of protectors has a first portion covering the dome part and a second portion covering the body part,
   an inner surface of the second portion facing the body part comprises at least one bonding area bonded to the body part via a bonding material, and
   an inner surface of the first portion which faces the dome part comprises a protrusion protruding toward the dome part, and the inner surface of the first portion is in contact with the dome part at the protrusion and faces the dome part via a clearance at a portion other than the protrusion.

* * * * *